Figure 1:
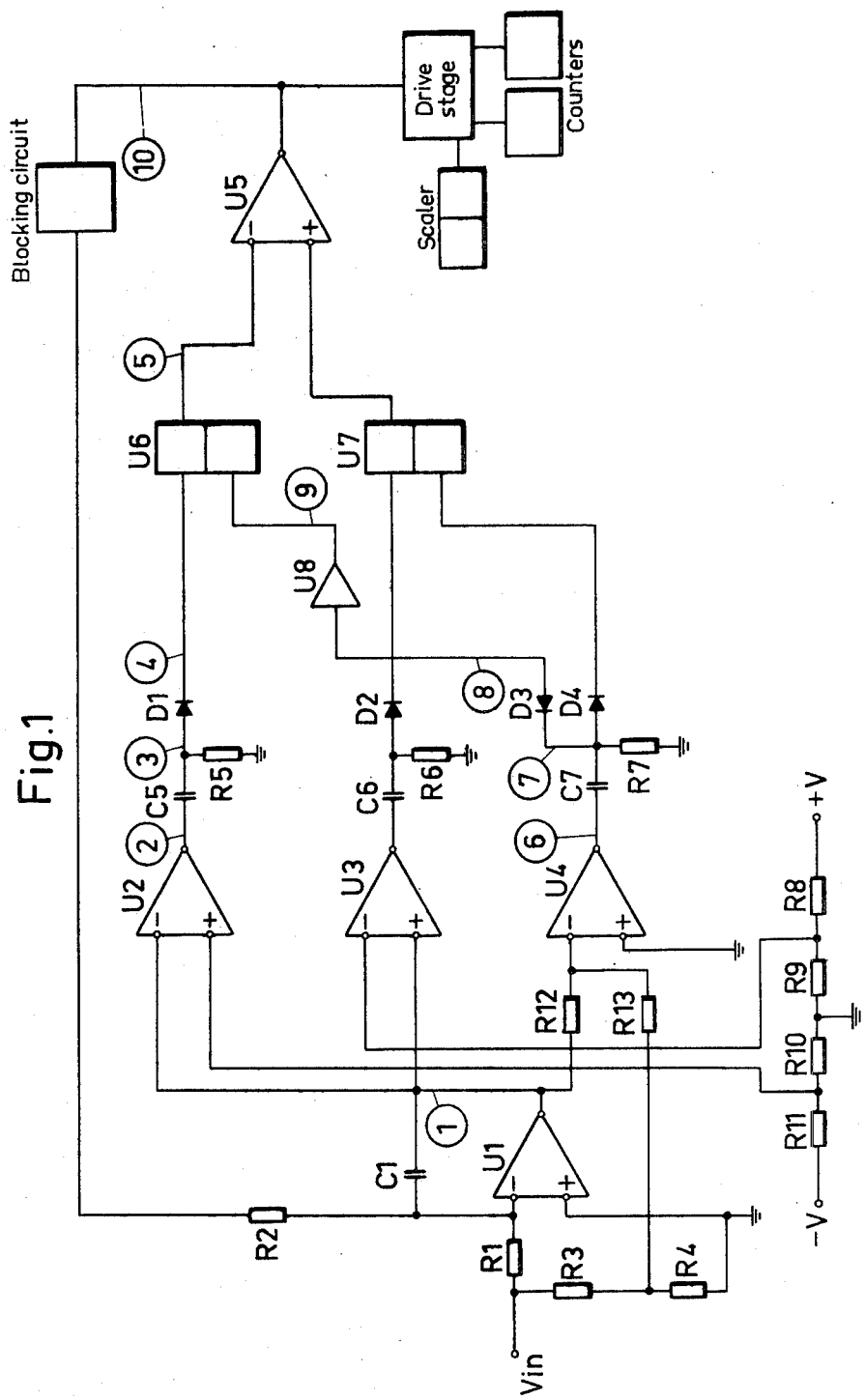

United States Patent

[11] 3,579,125

[72] Inventors Lars A. Lindblad
 Klingen;
 Rune N. Kahlbom, Uplands Vasby, Sweden
[21] Appl. No. 778,658
[22] Filed Nov. 25, 1968
[45] Patented May 18, 1971
[73] Assignee Junger Instrument Aktiebolag
 Stockholm, Sweden

[54] APPARATUS FOR RESETTING AN ANALOG INTEGRATOR
 1 Claim, 2 Drawing Figs.
[52] U.S. Cl. .................................................... 328/127
[51] Int. Cl. ..................................................... G06g 7/18
[50] Field of Search............................................ 307/229,
 234; 328/127, 128; 235/183, 150.53

[56] References Cited
 UNITED STATES PATENTS
3,188,455 6/1965 Quick, Jr. ..................... 235/183
3,454,886 7/1969 Bijl et al. ..................... 328/127X
3,487,204 12/1969 Emmerich ..................... 328/127X Primary Examiner—Donald D. Forrer
Assistant Examiner—B. P. Davis
Attorney—Fred Philpitt ABSTRACT: Apparatus for resetting an analog integrator with digital readout capability. The resetting signal, which discharges the integrating capacitor, is terminated when the output of the integrator reaches a level which is proportional to the analog input signal instead of completely discharging the integrating capacitor. This compensates for the errors present in prior art analog integrators caused by ignoring the analog input signal during the discharge time of the integrating capacitor. During the discharge of the integrating capacitor, an operational amplifier compares the integrator output voltage with a signal proportional to the analog input signal, called the compensating voltage. When two signals are equal the resetting signal is terminated.

APPARATUS FOR RESETTING AN ANALOG INTEGRATOR

The present invention relates to an apparatus for resetting an analog integrator with digital read-out of the analog signal. An automatic resetting of the integrator will result in an extension of its range of integration in displaying the number of resets on a mechanical or electronical counter.

Most digital readout devices are operating according to a principle in which the output signal of an integration amplifier is supplied to an operational amplifier operating as a comparator and controlling a flip-flop. The flip-flop thereby emits a pulse the charge of which is a function of the integrated voltage. The pulse emitted by the flip-flop is fed back with reversed polarity to the input of the integration amplifier, thereby discharging the integration capacitor to a level enabling repetition of the cycle. The major problem of such digital readout devices resides in the difficulty of maintaining the charge of the reset pulse independent of ambient temperature.

A further problem in the use of prior-art digital readout devices resides in that they disregard the voltage being integrated over the capacitor during its discharge time.

The object of the present invention is to provide an apparatus for resetting an analog integrator whereby temperature drift and the maximum error due to discharge will be substantially negligible.

The invention is mainly characterized by the fact that an operational amplifier forming part of the analog integrator is arranged to interrupt the reset current through the integration capacitor as the output signal from the integrator reaches a lower limit value corresponding to a compensation signal which is directly proportional to the analog input signal at the tripping instant of the reset current.

One embodiment of the apparatus according to the invention will now be described more in detail reference being made to the accompanying drawings.

Figure 2:
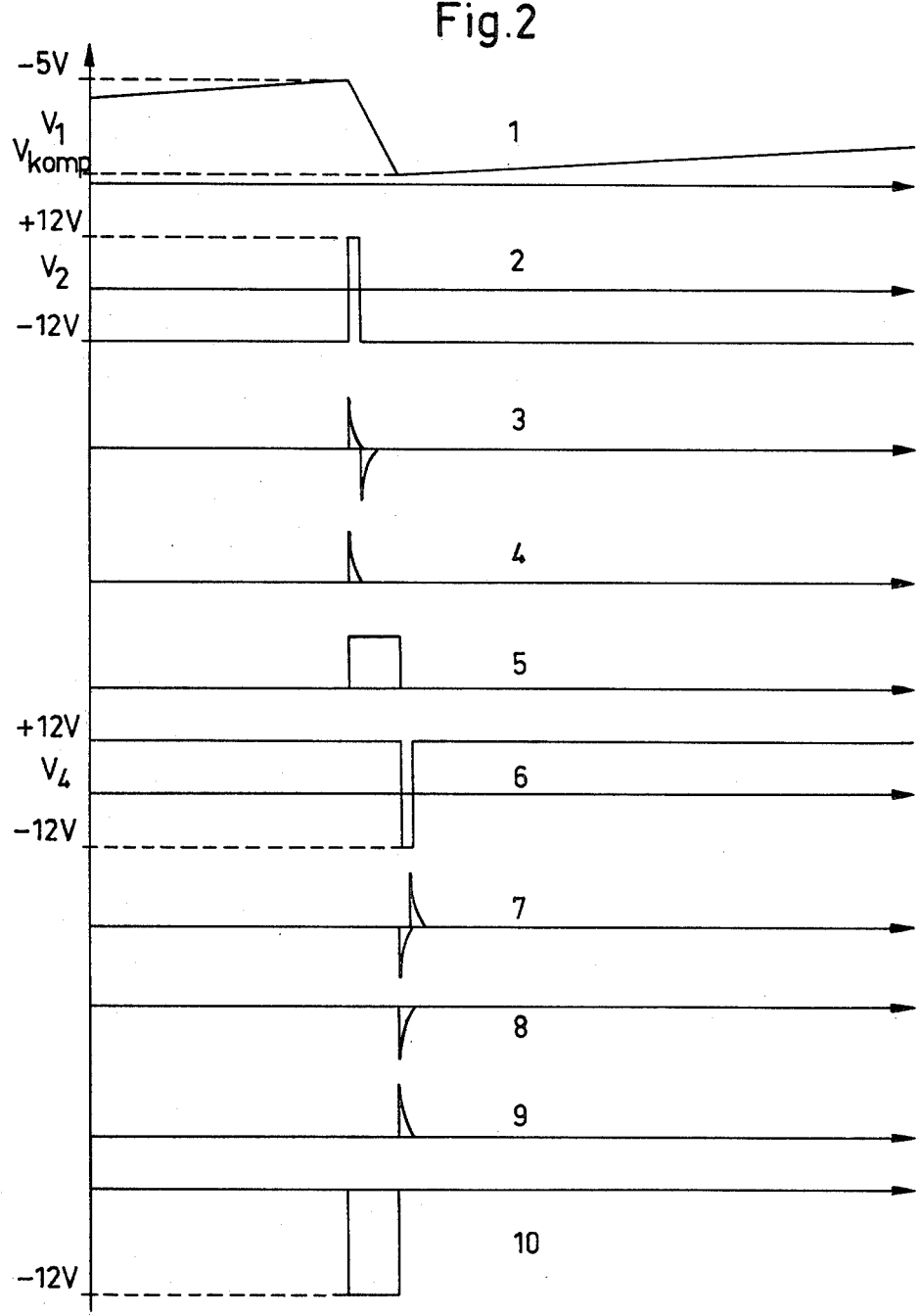

FIG. 1 shows a block diagram of an analog integrator according to the present invention, and FIG. 2 shows a waveform diagram illustrating the functions of the various blocks of FIG. 1.

An input voltage $V_{in}$ is integrated by means of a resistor $R_1$ and a capacitor $C_1$ as well as an operational amplifier U1. The output of the integrator will then have a polarity opposite to that of the input voltage $V_{in}$. The integrator U1 is capable of integrating both positive and negative input voltages without the need of any switching operation. In the present example, a positive input voltage $V_{in}$ is chosen. In this case, the output voltage $V_1$ derived from the integration amplifier U1 will rise at a rate which depends on the resistance $R_1$ and capacitance $C_1$. A plurality of operational amplifiers U2, U3 and U4 are coupled as comparators which means that they will emit a voltage pulse when the voltage supplied adopts a certain predetermined value. The switching level of operational amplifiers U2 and U3 is determined by a voltage divider R8, R9, R10 and R11. If, as assumed hereabove the analog input signal $V_{in}$ is positive, then the output voltage $V_1$ adopts a predetermined level, such as —5 volts, for example, the comparator U2 will switch over, whereby a positive voltage pulse $V_2$ will appear at the output of the comparator. This voltage pulse is differentiated by a capacitor C5 and a resistor R5, thus resulting in a positive and a negative pulse. A diode D1 will only admit the positive pulse therethrough to be supplied to a flip-flop U6. The latter will then be reversed and emit a positive signal to the minus-input-terminal of an operational amplifier U5. The output voltage of this last-mentioned amplifier will then be negative and fed back through a resistor R2 to the input of integration amplifier U1. This will cause the integration capacitor C1 to discharge at a rate depending on the values of resistor R2 and capacitor C1. The discharge period of the capacitor is selected to be approximately 100 times shorter than the maximum integration time period.

Now, according to the invention, an operational amplifier U4 has been incorporated in the analog integrator. The input voltage of this amplifier U4 is directly proportional to the input voltage $V_{in}$ of the integrator U1 and will here be designated "V-compensation" ($V_{comp}$). At the beginning of the reset current, the output voltage $V_1$ of the integrator is —5 volts and the voltage $V_{comp}$ is directly proportional to the input voltage $V_{in}$. The reset current, having negative polarity, will discharge capacitor C1, and when the output voltage $V_1$ has declined to a value equal to the voltage $V_{comp}$, the comparator U4 will emit a negative voltage pulse $V_4$. This negative voltage pulse is differentiated by a capacitor C7 and a resistor R7. A diode D3 will only admit the negative pulse to pass which is then reversed in polarity and supplied to flip-flop U6 causing resetting of the latter. This will cause interruption of the resetting current through capacitor C1.

A similar lapse will be repeated, if the input voltage $V_{in}$ is negative. The only difference will be that the operational amplifier U3 will instead function as a comparator, and the output signal from a flip-flop U7 will release the resetting current, being positive since the input-voltage is negative. Consequently, comparator U4 will emit a positive voltage pulse when the resetting current is to be interrupted. This positive voltage pulse resets flip-flop U7 which, in its turn, interrupts the resetting current. Thus, depending on the polarity of the input signal, either comparator U2 or comparator U3 will release the resetting current, which, however, in both cases is being interrupted by impulses from comparator U4. Connected between amplifier U5 and resistor R2 is a blocking circuit preventing leakage current to flow through resistor R2 during the integration period. Recording of the resets may be effected by supplying the output signal of operational amplifier U5, in addition, to a scaler or a counter recording the number of discharges.

The progress so far described will now be explained with reference to the waveform diagram of FIG. 2.

The output voltage $V_1$ from the integration amplifier U1 is represented by curve 1, and at the value —5 volts a positive voltage pulse $V_2$ is emitted by comparator U2, as shown in curve 2. The voltage pulse is differentiated, as appears from curve 3. The negative pulse is suppressed by a diode, and the positive pulse according to curve 4 is supplied to the input of operational amplifier U5. The operational amplifier U5 will then emit a negative reset current, the corresponding voltage characteristic of which is represented by curve 10, thereby causing capacitor C1 to discharge, as appears from curve 1. When the voltage according to curve 1 has declined to a level corresponding to $V_{comp}$, a negative voltage pulse will be emitted by comparator U4 according to curve 6. This negative voltage pulse is differentiated, as appears from curve 7. The positive pulse is suppressed, as appears from curve 8, and the negative pulse is finally reversed in polarity, as appears from curve 9. The last-mentioned polarity-reversed pulse resets the flip-flop U6, thereby interrupting the resetting current as appears from curve 10, after which the integration cycle can be repeated.

It is seen from the foregoing description that the maximum error in the digital read-out apparatus will appear when the voltage $V_{comp}$ equals zero, which means that the reset current will cause a complete discharge of the capacitor. Thus, if no voltage $V_{comp}$ existed, this would mean that the voltage integrated over the capacitor C1 during its discharge time was not taken into consideration. On the other hand, if the voltage $V_{comp}$ is introduced, compensation will be obtained for the voltage integrated during the discharge time of the capacitor. The voltage $V_{comp}$ can be selected to give satisfactory linearity. The method has certainly its limitation, for instance where the input voltage $V_{in}$ exhibits rapid variations, in which case the error may rise to a maximum of 1 percent, corresponding to the zero-value of the voltage $V_{comp}$. In most cases, however, the signal to be integrated has sufficiently slow-rate variations to make the error completely negligible. However, if rapid events are to be integrated, it would be suitable to introduce an integration or delay of the compensation voltage $V_{comp}$. The most significant advantage of the invention resides in that extended-time drift and temperature drift will become substantially negligible.

We claim:

1. Apparatus for resetting an analog integrator providing digital readout of an analog signal, such digital integrator comprising an operational amplifier, including an integrating capacitor, arranged to operate as an integration amplifier to convert an analog input signal into an output signal varying between two limit values and means responsive to the output signal for initiating, at the upper limit value of said output signal, a resetting signal for feeding back into the input of said integration amplifier at a polarity opposite to that of the input signal to cause discharge of said integration capacitor connected to said input, in which apparatus a second operational amplifier forming a part of said analog integrator is arranged to interrupt said resetting signal when the output signal of said integration amplifier reaches its lower limit value corresponding to a compensation signal which is directly proportional to said input signal during the occurrence of said resetting signal.